United States Patent
Jones et al.

(10) Patent No.: US 7,055,802 B1
(45) Date of Patent: Jun. 6, 2006

(54) APPLIANCE LIFT TOOL

(75) Inventors: Charles L. Jones, Stevensville, MI (US); Robert J. Schneider, Fennville, MI (US); Henry H. Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 700 days.

(21) Appl. No.: 10/145,509

(22) Filed: May 14, 2002

(51) Int. Cl.
 *B66F 3/22* (2006.01)
(52) U.S. Cl. .................................................. 254/122
(58) Field of Classification Search ............. 254/122, 254/8 R, 8 B, 8 C, 9 R, 9 B, 9 C, 10 R, 254/10 B, 10 C, 124, DIG. 1, 126
See application file for complete search history.

(56) References Cited

U.S. PATENT DOCUMENTS

| | | | | |
|---|---|---|---|---|
| 3,727,780 | A | | 4/1973 | Buccicone .................... 214/95 |
| 5,016,858 | A | * | 5/1991 | Mitchell ...................... 254/45 |
| 5,192,053 | A | * | 3/1993 | Sehlstedt ................... 254/122 |
| 5,695,173 | A | * | 12/1997 | Ochoa et al. ............... 254/122 |
| 6,199,826 | B1 | * | 3/2001 | Nix ............................. 254/8 B |
| 6,238,159 | B1 | | 5/2001 | Pappas ........................ 414/10 |
| 6,416,039 | B1 | * | 7/2002 | Pietrusynski ............... 254/8 B |
| 6,464,205 | B1 | * | 10/2002 | Wanner ..................... 254/122 |
| 6,516,478 | B1 | * | 2/2003 | Cook et al. .................... 5/611 |

FOREIGN PATENT DOCUMENTS

WO   WO98/55714   12/1998

OTHER PUBLICATIONS

WO 98/55714 Citations from Engineering Index, Design of a Low-Cost Wheelchair Lift by Sherry L. Smith, Paper #95-WA/DE-20, Nov. 1995.

* cited by examiner

*Primary Examiner*—Lee D Wilson
(74) *Attorney, Agent, or Firm*—Stephen Krefman; Robert O. Rice; John F. Colligan

(57) ABSTRACT

An appliance lift tool is provided which includes a support platform having a horizontal orientation, a bottom frame, a lift mechanism engaged between the support platform and the bottom frame to move the support platform toward and away from the bottom frame, while maintaining the support platform's horizontal orientation, and at least three feet extending below the bottom frame, with the feet being positioned outside of a perimeter of the support platform.

20 Claims, 5 Drawing Sheets

APPLIANCE LIFT TOOL

BACKGROUND OF THE INVENTION

The present invention relates to a tool which can be used to lift microwave ovens and other appliances and cabinets.

Oftentimes appliances, such as microwave ovens, are positioned, in a kitchen, above a range or cooktop and are secured in that position by removable threaded fasteners, for example directly to a wall of the room or to adjacent cabinets. However, in order to install and remove the microwave oven, it typically has been required that at least two people be involved in the operation, with one person lifting and supporting the microwave oven, while the other person secures or removes the threaded fasteners. Because of the limited space available for two people to be working on the same appliance, and because of the awkward positioning of the appliance directly above another appliance, installing and removing the microwave oven can be costly, time consuming and has the potential for causing damage to the appliances or injury to the installers.

Lifting tools are known for lifting and positioning various items such as cabinets, however, typically these lifting devices are supported directly on the floor and require a clear space beneath the item being lifted and positioned in place, which cannot occur when the item is an item such as a microwave oven being installed or removed from above another appliance, such as a range or cooktop.

SUMMARY OF THE INVENTION

The present invention provides a lifting tool for a microwave oven or other appliance, cabinet or similar item which is to be used for installing or removing the appliance from above a countertop which may include a different appliance positioned directly below the appliance being installed or removed. As used herein, "appliance" refers to microwave ovens, other kitchen appliances, cabinets and other similar items.

The tool includes a support frame for bridging the lower appliance and with support feet for engaging a countertop on either side of the lower appliance to prevent the lower appliance from being used as part of the support for the tool. In an embodiment, a screw operated scissors jack can be used to selectively raise or lower a supporting platform which can be raised into position to engage the upper appliance in its installed position. The lifting tool can fully support the weight of the upper appliance, through the countertop upon which its feet are supported, such that the upper appliance can be accurately positioned and held in place by the tool, allowing for the upper appliance to be secured in that position by threaded fasteners, or removed from that position, yet held in place until all of the threaded fasteners have been removed.

In this manner, a single person can use the tool to install or remove the upper appliance thus obviating the need for a second person to be involved in the operation. The tool will securely support the upper appliance preventing the upper appliance from falling and damaging either the upper or lower appliance. The tool will securely raise and lower the upper appliance thus obviating the possibility of injury to a person tempting to lift, lower and hold the appliance in an awkward position while it is being attached or detached from its mounting position. Also, use of the tool obviates the need for a second person to be operating in the area of the appliance while it is being raised, lowered and secured in place thereby reducing congestion in the area of the upper appliance as it is being installed or removed.

DETAILED DESCRIPTION OF THE PREFERRED EMBODIMENT

Figure 1:
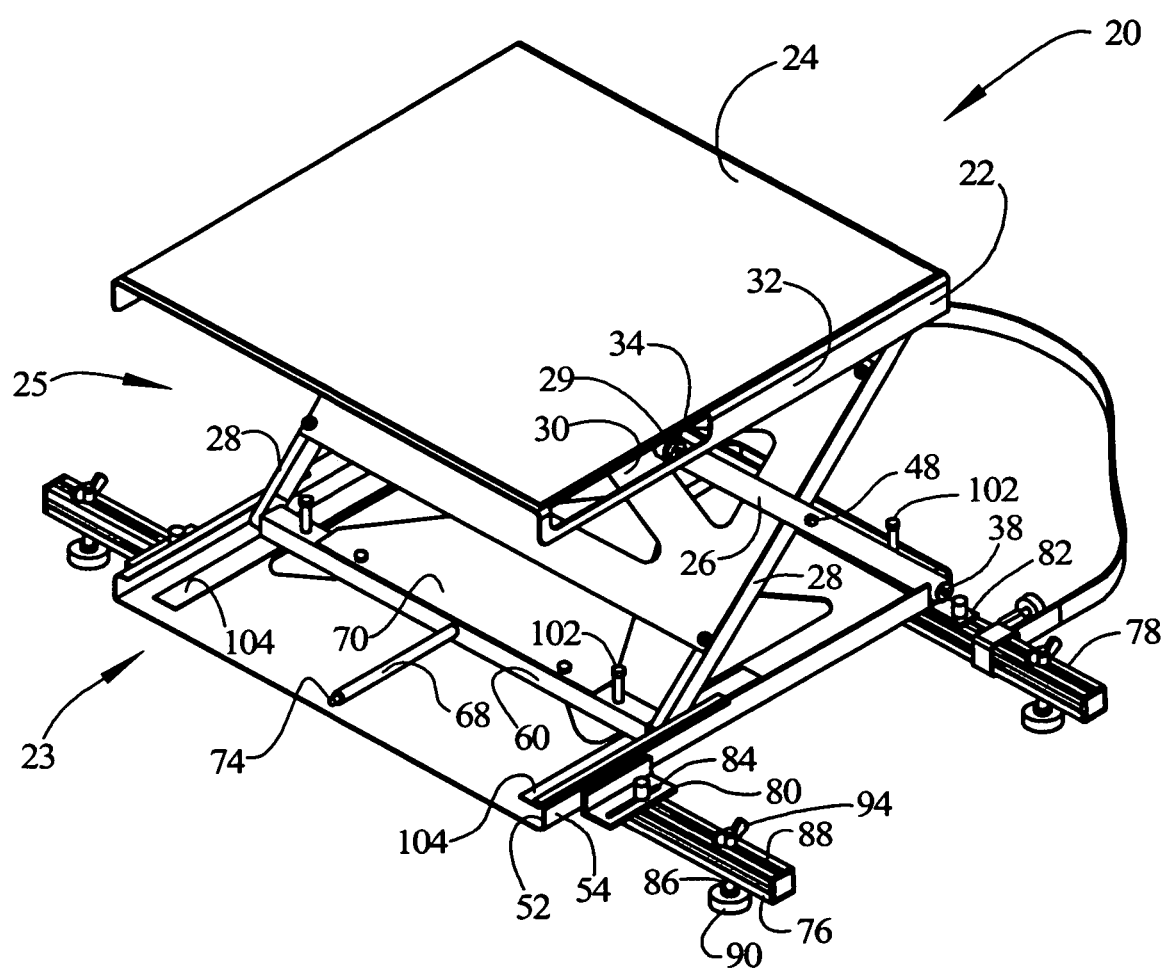
FIG. 1 is a perspective view of a microwave lift tool embodying the principles of the present invention.

In the figures there is illustrated an appliance lift tool generally at 20 which includes a top plate or support platform 22 having a horizontal orientation for engaging and supporting a microwave oven some other appliance or cabinet, or similar object, a bottom frame 23 for supporting the lift tool and a lift mechanism 25 engaged between the top plate and the bottom frame to move the top plate toward and away from the bottom frame while maintaining the top plate's horizontal orientation.

Although the invention can be practiced in many different embodiments and structures, one such embodiment has been selected for this disclosure which Applicant has found to be particularly useful and effective.

If desired, an additional wear plate 24 can be secured on top of the top plate 22 which could be made of a plastic material to ease in cleaning and adjusting the position of the upper appliance while it is being supported by the top plate 22.

Figure 3:
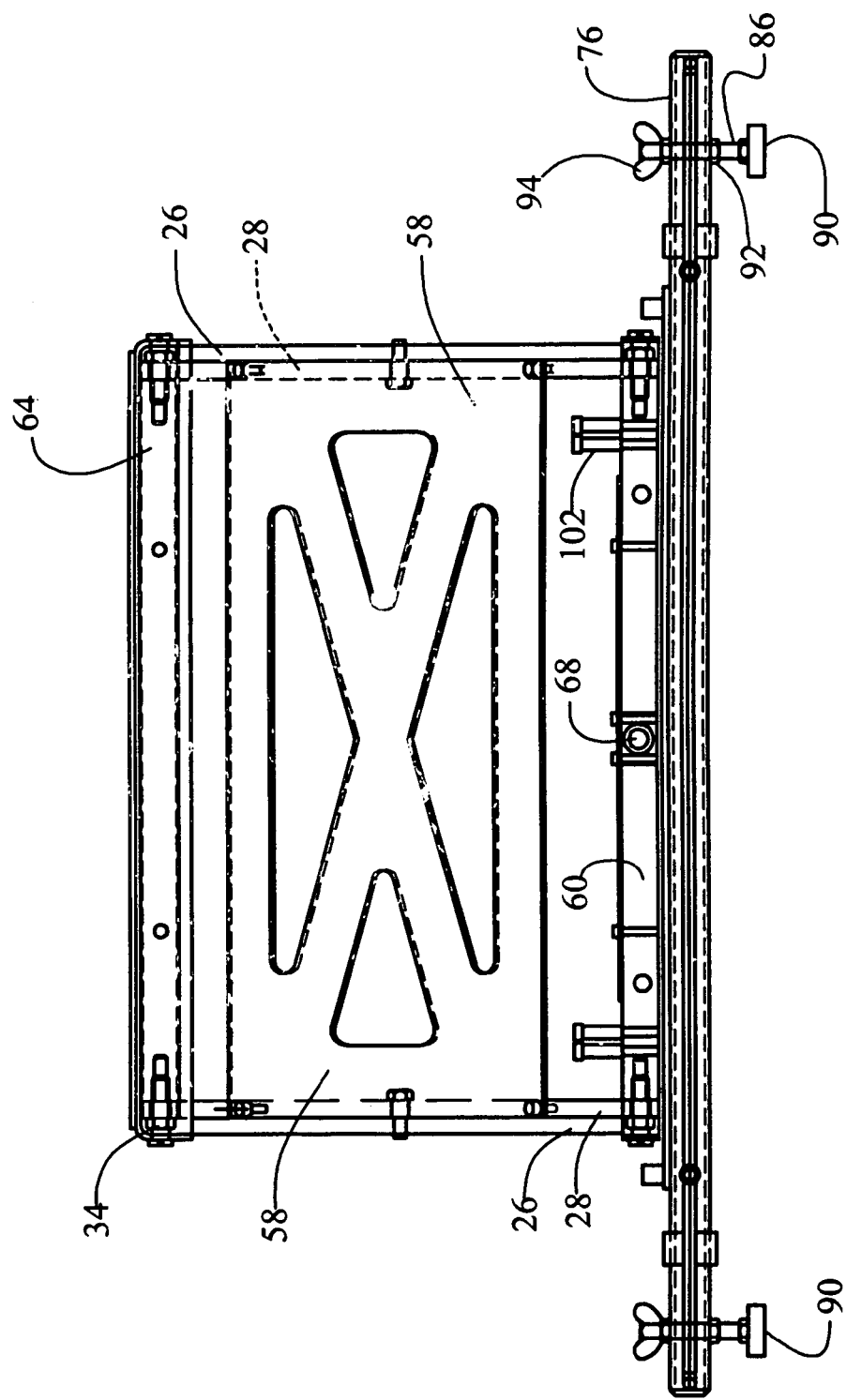
FIG. 3 is a front elevational view of the tool of FIG. 1.
Figure 4:
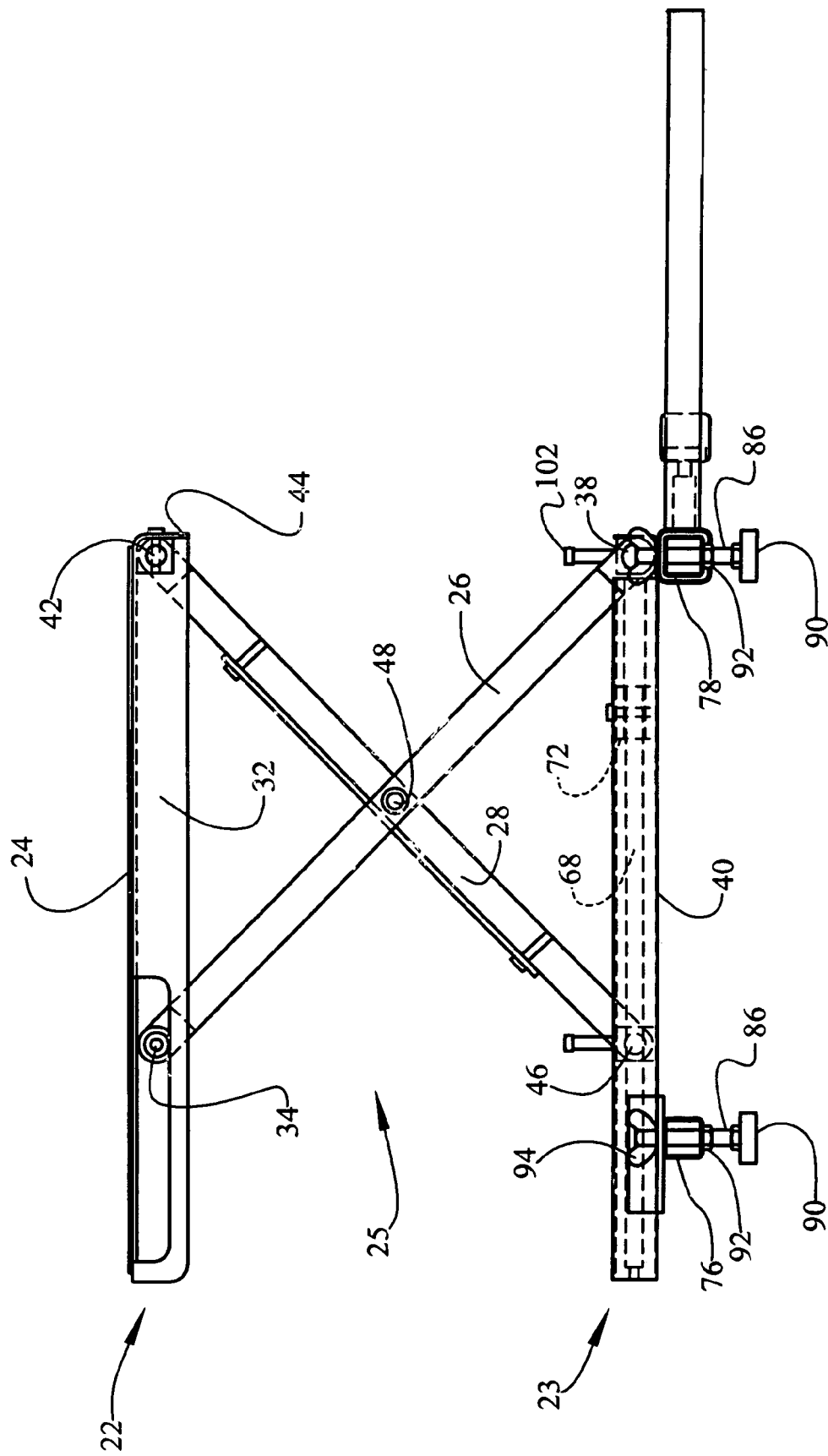
FIG. 4 is a side elevational view of the tool of FIG. 1.
Figure 5:
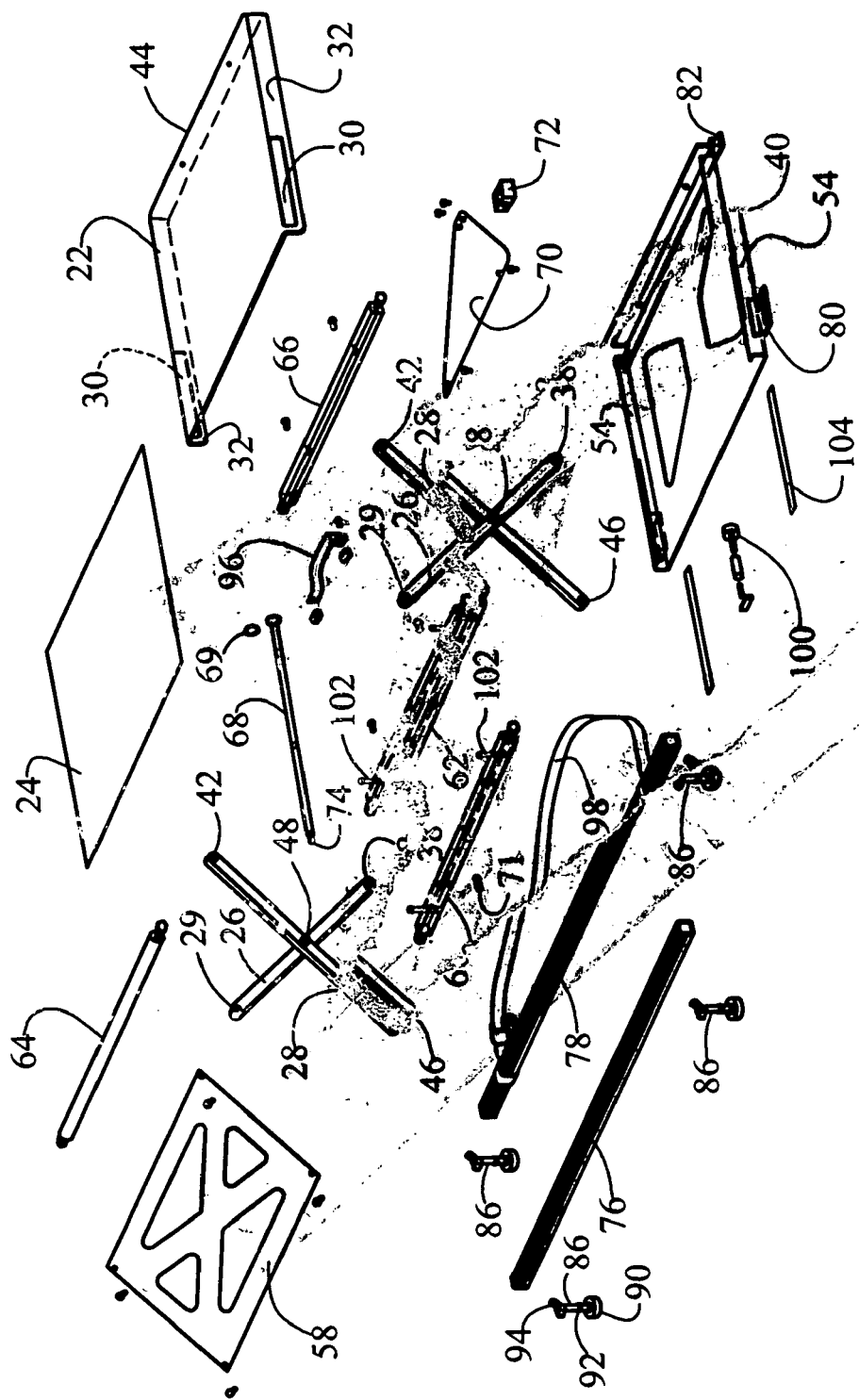
FIG. 5 is an exploded view of the tool of FIG. 1.

The top plate 22 in this embodiment is held in a horizontal orientation via the lift mechanism 25 which includes a pivot arrangement with a pair of first 26 and second 28 pivot arms located at either lateral side of the top plate 22. An upper end 29 of the first pivot arm 26 engages with a slot 30 formed in a downwardly depending sidewall 32 of the top plate 22. A roller 34 is rotatingly carried on the upper end 29 of the first pivot arm 26 and is received in the slot 30. A lower end 38 of the first pivot arm 26 is pivotally attached to a bottom plate 40 which, in this embodiment, may form a part of the bottom frame 23. The second pivot arm 28 is pivotally and slidingly engaged at an upper end 42 thereof near a rear edge 44 of the top plate 22 (FIG. 3) and is pivotally attached at a lower end 46 to the bottom plate 40. The first pivot arm 26 and second pivot arm 28 are pivotally connected to each other by a pin 48 midway along their lengths so that the two pivot arms pivot relative to each other in a scissors fashion. The lower end 46 of the second pivot arm 28 slidingly engages the bottom plate 40 by means of a roller 50 rotatingly held on the lower end 46 of the second pivot arm 28 which engages in a track 52 of the bottom plate 40 formed by an upstanding sidewall 54 and a horizontal flange 56. In this manner, the top plate 22 and bottom plate 40 are held in a parallel relationship to one another by the two sets of pivot arms 26, 28 and can move toward and away from each other in this parallel relationship by the scissoring movement of the pivot arms that are pivotally secured to the rear side of the top plate and bottom plate and slidingly received near the front side of the top plate and bottom plate.

Other lifting mechanisms differing from the pivot arm arrangement disclosed can also be used according to the invention, so long as the top plate 22 is maintained in a generally horizontal orientation as it is raised and lowered.

To stabilize and strengthen the lifting tool and the pivot arms, in this embodiment, part of the bottom frame 23 may include a mid-plate 58 secured to the two second arms 28, such as by threaded fasteners, and a runner block 60 extending as a cross member between the two lower ends 46 of the second pivot arms 28. A lower pivot block 62 extends between the two lower ends 38 of the first pivot arm 26 and is secured to the bottom plate 40. A roller bar 64 extends between the two upper ends 36 of the first pivot arm 26 and a top pivot block 66 extends between the two upper ends 42 of the second pivot arm 28 and is secured to the top plate 22. In this manner, a rigid support frame is provided for the pivot arms 26, 28 which prevents racking and which assures smooth parallel movement of the top plate 22 relative to the bottom plate 40. The various components which comprise the bottom frame 23 can be joined together as a fewer number of integral pieces than as shown in the illustrated embodiment or can be further sub-divided into additional individual components. Depending on the weight and size of the appliances to be lifted by the lift tool 20, not all of the structural elements of the bottom frame 23 may be necessary for a given application or additional structural elements may be utilized.

Extending between the runner block 60 and the lower pivot block 62, in this embodiment, as part of the lift mechanism 25, is a drive screw 68 which is rotatingly received in the lower pivot block 62 and captured there in an axial direction, such as by a retaining ring 69. The drive screw 68 extends through the runner block 60 unimpeded, for example passing through a bearing 71 or other friction reducing device held in the runner block 60. The portion of the drive screw 68 extending through the runner block 60 has a smooth cylindrical surface. A portion of the drive screw 68 extending between the runner block 60 and the lower pivot block 62 is threaded to engage in a threaded opening located in a surrounding material which is fixed in position relative to the runner block 60. For example, a stabilizer triangle 70 is secured to the runner block 60, such as by threaded fasteners, and lays parallel to and above the drive screw 68. At a rear edge of the stabilizer triangle 70 there is secured a threaded rod retainer block 72 containing the threaded opening through which is threadingly received the drive screw 68. The rod retainer block 72 is secured to the stabilizer triangle 70, for example, by threaded fasteners. The threaded opening could also be formed directly in the runner block 60 or in an object connected directly to the runner block 60, alternatively to the arrangement as shown where the rod retainer block 72 is connected indirectly to the runner block 60.

The drive screw 68 is preferably provided with a drive profile 74 such as a square or hex protrusion or recess for receiving and engaging a complementarily shaped driver, such as an electrically powered drill with a square or hex head driver bit or a manually powered wrench or driver.

As the drive screw 68 is rotated, the rod retainer block 72 will be caused to move forward or backward along the threaded portion of the drive screw, thereby moving the runner block 60 forward or backward due to the connection through the stabilizer triangle 70. In this manner, the scissors pivoting action of the first and second pivot arms 26, 28 can be effected.

Cams, gears, ratchets or other motion converting devices, preferably employing a mechanical advantage, can be used to drive the lift mechanism 25.

A front strut 76 and a rear strut 78 are provided to extend laterally below the front and rear of the bottom plate 40, respectively. The struts 76, 78 are secured to the bottom plate 40 via front 80 and rear 82 flanges extending from the bottom plate 40. The flanges may include slots 84 to permit forward or rearward adjustment of one or both struts 76, 78 as required for a particular installation application. One or both of the struts may be formed integrally with the bottom plate 40 on other components of the bottom frame 23. Further, the entire bottom plate 40 may double as the struts, or a greater number of individual struts may be secured to the bottom plate.

A threaded bolt 86 is provided in a vertical slot 88 formed near each end of the front and rear struts 76, 78 such that the bolts 86 can move laterally along a portion of the struts. A pad 90 is held on a lower, head end of each bolt 86, a jam nut 92 is carried on a threaded shank of each bolt 86 and positioned below the struts, 76, 78 while a wing nut 94 is threadingly engaged onto an end of the bolt opposite the pad 90, which extends above the struts. The pads 90 function as feet to engage a supporting surface for the lift tool 20 and the jam nuts 92 can be used to provide a leveling adjustment so that each of the four pads can engage the support surface, even when the support surface has some unevenness or if it is not perfectly level. The wing nuts 94 can be selectively untightened and re-tightened to permit the bolts 86 to moved laterally so that a proper support surface can be engaged by the pads 90.

Figure 2:
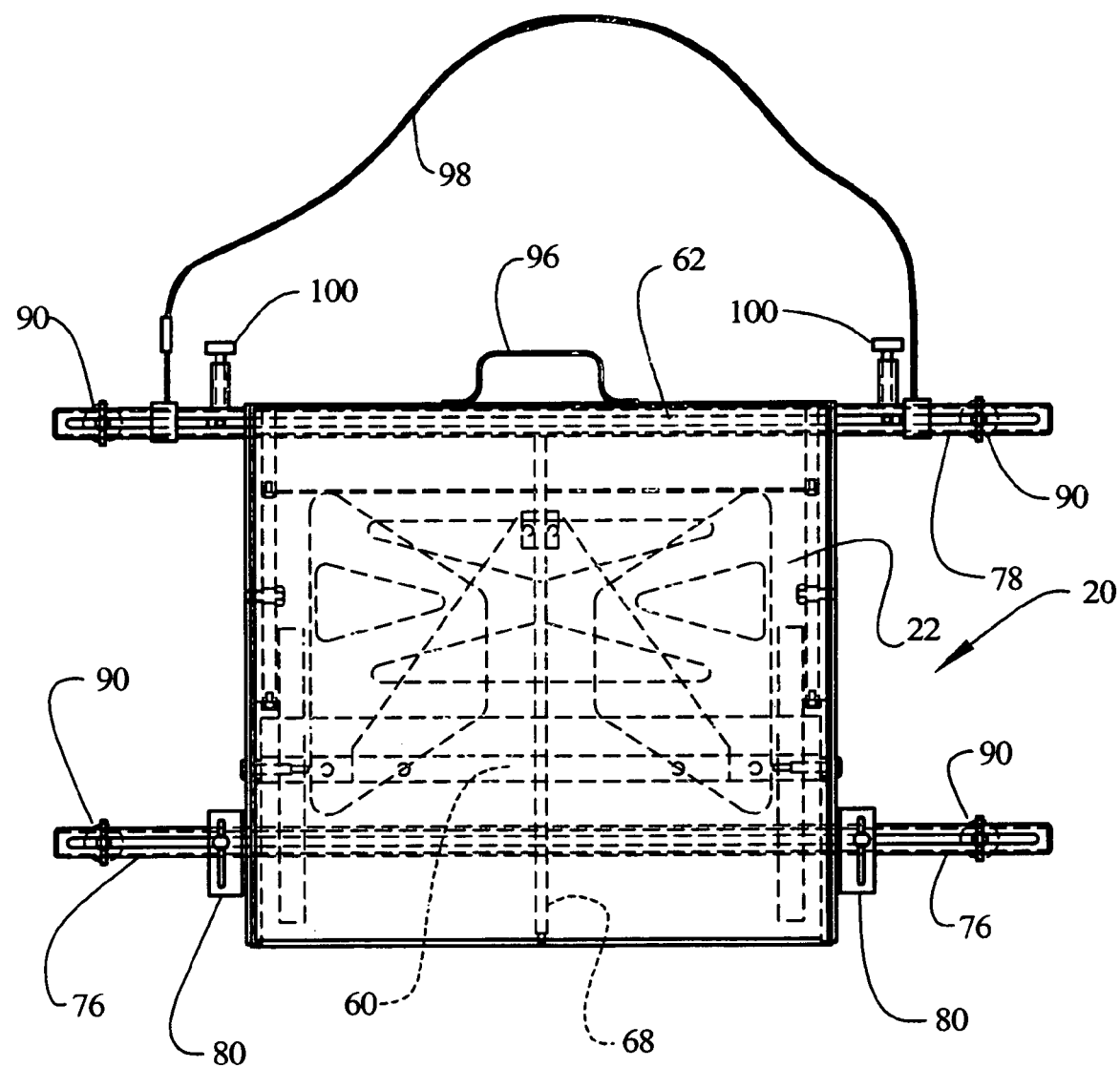
FIG. 2 is a plan view of the tool of FIG. 1.

As best seen in FIG. 2, the pads 90 are positioned outside of a perimeter of the top plate 22. Although the pads 90, which function as feet for the lift tool 20, are shown in this embodiment to be laterally and vertically movable, and the front pads moveable in a front-to-back direction relative to the bottom plate 40, such adjustability is not critical to the invention, and various embodiments may include fixed pads or pads movable in fewer or more ways than shown in the exemplary embodiment disclosed. At least three feet or pads are required, and in some situations, more than four may be utilized.

A carrying handle 96 can be secured to the bottom plate 40, for example by threaded fasteners. The handle 96 could also be secured to one of the top plate 22 or rear strut 78. A strap 98 can be secured to the lift tool 20, for example, to the rear strut 78 to extend rearwardly of the rear strut. The strap 98 likewise could be secured to the top plate 22 or bottom plate 40. A plurality of bumpers 100 can be provided to extend rearwardly of the rear strut 78 (or top plate 22 or bottom plate 40).

Shoulder bolts 102 may be provided to extend vertically from the runner block 60 and lower pivot block 62 to engage with a lower side of the roller bar 64 and top pivot block 66 when the top plate 22 has been moved to its lowermost position, to prevent over closing of the lift tool 20.

Friction reducing strips 104 may be provided on the lower plate 40 for engagement by the runner block 60 to assist in the smooth pivoting action of the lift mechanism 25.

The lift tool 20 is typically used to engage and support an upper appliance, such as a microwave oven, or a cabinet or other similar item positioned above a range or cooktop or other lower appliance where the range or cooktop is positioned between two cabinets with countertop surfaces. It is desirable to lift and support the upper appliance without utilizing the range or cooktop (lower appliance) as a supporting surface, so as to prevent any damage to the top surface of the lower appliance, which may not be designed to support the added weight of the upper appliance.

The lift tool 20 can be carried to the place of utilization by engaging the carrying handle 96 or the strap 98 which can act as a shoulder strap. Once in the location of the upper appliance to be engaged or lifted, the lift tool 20 is positioned on the countertops adjacent to the lower appliance such that the pads 90 engage the countertops and not the top surface of the lower appliance. This may require the bolts 86 to be moved laterally in the slots 88 of the struts 76, 78 and may require that the jam nuts 92 be adjusted so that each of the pads 90 securely engage the supporting countertops to present the top plate 22 in a horizontal orientation.

The lift tool 20 should be adjusted so that the top plate 22 is positioned to engage an appropriate area of the upper appliance being supported so as to adequately support the weight of the upper appliance, particularly where the upper appliance may have internal components located such that a center of gravity of the upper appliance is not centered within the upper appliance.

The strap 98 may be used to stabilize the lift tool 20 by passing it around a rear console of the lower appliance which is being bridged by the struts 76, 78, if the lower appliance has such a console.

A tool, such as an electric drill with an appropriate driver, or a non-powered wrench or driver, can be used to engage the drive profile 74 of the drive screw 68 to rotate the drive screw. This will cause the top plate 22 to rise in a horizontal orientation to either lift the upper appliance which has been placed on the top plate, or to move up and engage a lower surface of the upper appliance to be supported and removed. Once the top plate 22 has been moved up into the correct position, the upper appliance can either be secured in place, or detached from its attachment above the lower appliance by release of the fastening devices holding the upper appliance in that position. During this time, the lift tool will fully support and stabilize the upper appliance. The rotational direction of the drive tool can then be reversed so that the drive screw 68 is driven in a reverse rotational direction causing the top plate 22 to be moved downwardly toward the bottom plate 40, thereby lowering the upper appliance that has been detached or collapsing the lift tool after the upper appliance has been reattached.

Of course, if the upper appliance is to be lifted above a countertop with no lower appliance below the upper appliance, the lift tool 20 may also be utilized, however, the pads 90 will not be required to be moved to avoid engagement with a lower non-countertop appliance.

As is apparent from the foregoing specification, the invention is susceptible of being embodied with various alterations and modifications which may differ particularly from those that have been described in the preceding specification and description. It should be understood that the scope of the patent warranted hereon is intended to include all such modifications as reasonably and properly come within the scope of the disclosed contribution to the art.

The invention claimed is:

1. An appliance lift tool comprising:
   a top plate having a horizontal orientation,
   a bottom plate having two front corners and two rear corners,
   a spaced pair of first and second pivot arms,
      said first pivot arms being pivotally connected at a lower end near said rear corners of said bottom plate and being slidingly captured at a top end by said top plate,
      said second pivot arms being pivotally connected at an upper end near a rear edge of said top plate and being slidingly captured at a lower end by said bottom plate,
      each pair of said first and second pivot arms being pivotally connected to each other approximately midway along their lengths,
   a cross member connecting said lower ends of said second pivot arms,
   a threaded opening located in a surrounding material fixed relative to said cross member,
   a drive screw threadingly extending in a front to rear direction through said threaded opening and being captured relative to said rear edge of said bottom plate in a rotatable, but axially fixed manner,
   a front and rear strut extending laterally across and below said bottom plate, and
   a laterally adjustable foot extending through each of said struts near both lateral ends of each of said struts.

2. An appliance lift tool according to claim 1, including a handle secured to one of said top plate, bottom plate and rear strut.

3. An appliance lift tool according to claim 1, including a strap secured at each end to one of said top plate, bottom plate and rear strut.

4. An appliance lift tool according to claim 3, wherein said ends of said strap are adjustably secured, in a lateral position, to said rear strut.

5. An appliance lift tool according to claim 1, wherein said feet have lower surface engaging pads whose position relative to said struts is vertically adjustable.

6. An appliance lift tool according to claim 1, including a plate extending between said second pivot arms.

7. An appliance lift tool according to claim 1, including a roller bar extending between said upper ends of said first pivot arms.

8. An appliance lift tool according to claim 1, including a pivot bar extending between said lower ends of said first pivot arms and secured to said lower plate.

9. An appliance lift tool according to claim 1, including a pivot bar extending between said two lower ends of said first pivot arms and wherein said drive screw extends through an oversize opening in said pivot bar.

10. An appliance lift tool according to claim 1, wherein said cross member has an oversized opening therethrough for receiving said drive screw.

11. An appliance lift tool according to claim 10, including a bearing located in said oversized opening in said cross member.

12. An appliance lift tool according to claim 1, wherein said threaded opening is formed in a block separate from, but attached to said cross member.

13. An appliance lift tool according to claim 12, wherein said block is attached to said cross member via a horizontal plate spacing said block a distance rearward of said cross member.

14. An appliance lift tool according to claim 1, wherein said drive screw has a drive profile at an end thereof.

15. An appliance lift tool according to claim 1, wherein said upper ends of said first pivot arms carry rollers which are captured in slots formed in downward depending flanges of said top plate.

16. An appliance lift tool according to claim 1, wherein said lower ends of said second arms carry rollers which are captured in tracks formed by upward and inward extending flanges of said bottom plate.

17. An appliance lift tool according to claim 1, wherein said front strut is adjustably positioned relative to said bottom plate in a front to rear direction.

18. An appliance lift tool according to claim 1, including bumpers extending rearwardly of one of said top plate, bottom plate and rear strut.

19. An appliance lift tool comprising:

a support platform having a horizontal orientation, a bottom frame, a lift mechanism engaged between said support platform and said bottom frame to move said support platform and away from said bottom frame, while maintaining said support platform's horizontal orientation, and a pair of struts extending below said bottom frame for supporting the appliance lift tool above a lower appliance.

20. The appliance lift tool of claim 19, wherein said pair of struts include a plurality of laterally adjustable feet.

* * * * *